United States Patent Office 3,418,356
Patented Dec. 24, 1968

3,418,356
PREPARATION OF CHLORINE SUBSTITUTED ALKYL FLUOROFORMATES
Karl O. Christe and Attila E. Pavlath, Berkeley, Calif., assignors to Stauffer Chemical Company, New York, N.Y., a corporation of Delaware
No Drawing. Filed Dec. 21, 1964, Ser. No. 420,182
5 Claims. (Cl. 260—463)

ABSTRACT OF THE DISCLOSURE

Process for the preparation of chlorine substituted alkyl fluoroformates by reacting a cyclic aliphatic ether (heterocyclic compound in which the heteroatom is oxygen and the carbon chain of the heterocyclic compound contains from 2 to 5 substituted or unsubstituted carbon atoms, the substituted groups being hydrogen, alkyl, aryl, alkenyl halogen, haloalkyl and epoxyl) with carbomyl chlorofluoride under substantially anhydrous conditions and, optionally, in the presence of a catalytic amount of a saturated tertiary amine and when the hererocyclic compound contains 4 or 5 carbon atoms, a hydrogen chloride source.

---

This invention relates to a new and novel process for the preparation of chlorine substituted alkyl fluoroformates. More particularly, this invention pertains to a new and novel reaction whereby chlorine substituted alkyl fluoroformates can be easily prepared from cyclic aliphatic ethers.

Using the methods available in prior art the preparation of the compounds of the present invention would require two and three steps, provided the appropriate starting materials were available. Such a process would include the reaction of the corresponding chloroalkanol and carbonyl chloride followed by the subsequent fluorination of the resulting chloroalkyl chloroformate. Although Jones (J. Chem. Soc. 2735 (1957)) describes the reaction of carbonyl chloride with 1:2 epoxides, this would result only in 2-chloroalkyl chloroformates which would require a further fluorination step to obtain the corresponding fluoroformate.

The compounds obtainable from the process of the present invention are extremely valuable intermediates. By utilizing the method of Nakanishi et al. (JACS, 77, 5033 (1955)) the chloroalkyl fluoroformate can be easily converted by decarboxylation using boron trifluoride etherate catalyst to the corresponding chlorofluoroalkane. This material can be further transformed by dehydrochlorination to a fluoroalkene. In addition, the fluoroformates may be used as copolymers as in the polymerization with thiocarbonyl fluoride. They may be used as intermediates for pharmaceutical preparations, agricultural chemicals and the like.

A principal object of our invention is to provide for the preparation of chloroalkyl fluoroformates starting with cyclic aliphatic ethers by a new and novel reaction which does not require multiple steps, but is direct. Another object is provision of a process for preparing chloroalkyl fluoroformates from cyclic aliphatic ethers by means of a new and novel ring opening of said cyclic ethers.

Pursuant to the above mentioned and yet further objects, it has been found that the chloroalkyl fluoroformates of the present invention can be conveniently prepared by reacting carbonyl chlorofluoride with cyclic aliphatic ethers. The cyclic aliphatic ethers applicable within the embodiment of the present invention are the epoxy or heterocyclic compounds, wherein the heteroatom is oxygen. These compounds are characterized by an oxygen linked, in a chain of carbon atoms, to two of the carbon atoms. The carbon chain may contain from 2 to 5 carbon atoms, inclusive. The three-membered cyclic ethers are known as vicinal or 1,2-epoxides as ethylene oxide, the four-membered cyclic ethers are known as 1,3-epoxides, as trimethylene oxide. The five- and six-membered mono-cyclic ethers are usually known by their heterocyclic names, such as tetrahydrofuran and tetrahydropyran, respectively. Furthermore, the carbon atoms making up said carbon chain may be substituted with such groups as hydrogen, alkyl, alkenyl, aryl, halogen, haloalkyl and epoxyl. Thus, such compounds as, for example, ethylene oxide, chloroethylene oxide, bromoethylene oxide, methylethylene oxide, α-epichlorohydrin, ethylethylene oxide, trimethylene oxide, 3-bromo tetrahydrofuran, 3,4-dibromotetrahydrofuran, butadiene monoxide, butadiene dioxide, α,α'-dimethylethylene oxide, 2-methyl tetrahydrofuran, isopropyl ethylene oxide, 2-methyl tetrahydropyran, 2-methyl-6-chlorotetrahydropyran, phenylethylene oxide, α-methyl-α'-phenylethylene oxide, and 2-methyl-5-phenyl tetrahydrofuran, may be operable within the scope of the invention. The ring-opening reaction may proceed with or without a catalyst, although as the carbon chain becomes 4 and 5 members in length a dual catalyst system is necessary to activate each reactant. Inherent in the ring-opening reaction is the possibility of isomer formation in unsymmetrical systems. This is brought about by the two ways in which a cyclic ether may open, depending upon which carbon-oxygen bond breaks, with the addition of the parts of carbonyl chlorofluoride, that is the chloro and fluoroformyl groups.

Except for the reactions of carbonyl chlorofloride with ethanol and certain amines as reported by Emeleus and Wood (J. Chem. Soc. 2183 (1948)), no other reactions of carbonyl chlorofluoride with organic compounds is mentioned in the literature. The reaction of carbonyl chloride with 1,2-epoxides as done by Jones, supra, is exclusively with 1,2-epoxides and does not include the larger oxygen-containing heterocyclic systems. The products obtained by Jones are 2-chloro-substituted chloroformates. Therefore, the present invention offers a new and novel reaction of carbonyl chlorofluoride with aliphatic cyclic ethers to prepare new and valuable compounds.

The reaction of the present invention is carried out under substantially anhydrous conditions to minimize hydrolysis of the chloro-substituted alkyl fluoroformate produced therein. The vessel used for the reaction should be of substantial material as will allow operation at high pressures and moderate temperatures. Provision should be made to remove excess carbonyl chlorofluoride after the reaction is completed. Some form of agitation of the reactants is desirable in order to achieve a more intimate contact. When the reaction is vigorous it is desirable to employ a diluent such as benzene, toluene and the like in order to moderate the reaction. The products of the reaction and the unreacted materials can be separated by conventional methods of vacuum distillation in the case of liquids and crystallization in the case of solids.

Carbonyl chlorofluoride, which is used herein as a reactant, can be conveniently prepared by several methods described in the literature. All of the methods start with phosgene and vary the nature of the fluorinating agent and the conditions employed therein.

The reaction will proceed at atmospheric and superatmospheric pressures. However, the preferred pressures are superatmospheric. An excess of carbonyl chlorofluoride is used to assist in shifting the equilibrium established in the reactor to the desired products by mass action.

The proportion of carbonyl chlorofluoride to cyclic ether is not narrowly critical. The preferred range of reactants is at least 1 mole of carbonyl chlorofluoride for each epoxy or internal oxide bonding present in a given molecule. The particularly preferred range is 1 to 2 moles of carbonyl chlorofluoride for each epoxy or internal oxide bond present in the given cyclic ether. An excess of carbonyl chlorofluoride, as stated above, is desirable to shift the equilibrium to the formation of the chloro-substituted fluoroformates. The use of an inert solvent, such as toluene or benzene, was found helpful in moderating the more vigorous reactions.

Although the reaction of the present invention will proceed with or without a catalyst, the use of a basic catalyst was found useful in obtaining maximum conversions and yields. In general, any saturated tertiary amine was found to be acceptable as a catalyst and may be used as such. The preferred tertiary amine for the new and novel reactions involved in the present invention is tri-n-butylamine. Good results are obtained when using between one percent and twenty percent of catalyst by weight, based on the weight of the epoxide or cyclic ether employed. Since the larger cyclic ether systems (5 and 6 membered) are more stable due to steric and electronic factors, it was found that in order to obtain satisfactory conversions of the larger rings it was necessary to employ a second catalyst. Although some ring-opening can be accomplished using only carbonyl chlorofluoride and a tertiary alkyl amine, hydrogen chloride or a hydrogen chloride donator was found to facilitate opening of the larger rings in order to reach a high conversion of starting material. The hydrogen chloride donator may be selected from the group consisting of hydrogen chloride gas, an amine hydrochloride, and the combination of carbonyl chlorofluoride or carbonyl chloride and an alcohol, wherein hydrogen chloride would be generated slowly in situ.

The temperature of the reaction is not critical and is kept as low as operability permits. The temperature range will be between 0° C. and about 150° C. or as high as the epoxide or cyclic ether used requires, within the given conditions of the invention. Each epoxide or cyclic ether will have its particularly favorable conditions pertaining to temperature pressure and reaction time to achieve maximum conversions and yields, but will lie within the limits of this invention.

Broadly considered, practice of the invention involves contacting a heterocyclic organic compound containing one or more internal ether or epoxide bonds with carbonyl chlorofluoride in the presence of a saturated tertiary amine at autogeneous pressures. In the case of five and six membered epoxides a secondary catalyst capable of supplying hydrogen chloride is necessary. Specific temperatures to be employed are dependent upon the particular starting material utilized.

The process of the invention may be suitable carried out by introducing under substantially anhydrous conditions the gaseous carbonyl chlorofluoride into a cooled pressure vessel containing the epoxide as defined above, solvent and appropriate amount of tertiary amine as catalyst. When the epoxide consists of a ring of five or six members a hydrogen chloride source is also included in the list of reactants. The reactants in the reactor vessel are agitated by some suitable means for a time sufficient to convert the epoxide to the corresponding chloroalkyl fluoroformate. The gaseous material is then removed from the pressure vessel and recovery by appropriate means is made of said chloroalkyl fluoroformate produced therein.

The following examples illustrate the process of this invention.

EXAMPLE 1

A series of reactions between ethylene oxide and carbonyl chlorofluoride were carried out to compare various conditions.

The reactions were carried out in a 75 ml. stainless steel lecture bottle. Into the vessel were added 0.3 mole of ethylene oxide and an excess of carbonyl chlorofluoride varying between 30 percent and 80 percent based on the amount of ethylene oxide. The purity of the carbonyl chlorofluoride was not critical and ranged between 84 and 90 percent. The major impurities consisted of carbonyl chloride and carbonyl fluoride. When a catalyst was used, 0.2 ml. of tri-n-butylamine was added to the reactants. The lecture bottle was closed and pressure registering equipment attached. The reactants in the pressure vessel were shaken at room temperature for several hours. The excess carbonyl chlorofluoride was removed and the liquid reaction products were analyzed by gas chromatography. The reaction products were then separated by distillation. In all cases 2-chloroethyl fluoroformate was obtained. It is a colorless liquid with a characteristic fluoroformate odor and had the following properties: boiling point 122–24° C. at 760 mm. Hg; refr. index 1.3922 at 22° C.; density 1.314 at 23° C.

*Analysis.*—Calculated for $ClCH_2CH_2OCOF$: C, 28.46; H, 3.16; F, 15.02; Cl. 28.06. Found: C, 28.60; H, 2.83; F, 15.19; Cl, 28.17.

Table I summarizes the reactions carried out in the afore-described manner.

TABLE I.—REACTION: ETHYLENE OXIDE AND CARBONYL CHLOROFLUORIDE

| Experiment No. | Catalyst | Temp. (deg.) | Conversion of oxide, percent | Yield of $Cl(CH_2)_2OCOF$, percent |
|---|---|---|---|---|
| 1 | None | 24 | 99 | 49.8 |
| 2 | do | 0 | 99 | 49.8 |
| 3 | $N(But)_3$ | 24 | 100 | 99.8 |

It can be seen that the reaction proceeds satisfactorily in all cases but the yield of the fluoroformate is greatly enhanced by the use of a catalyst.

EXAMPLE 2

In a similar procedure as Example 1, 0.3 mole of trimethylene oxide (1,3), 0.34 mole of carbonyl chlorofluoride (15 percent excess) and 0.2 ml. of tri-n-butylamine as a catalyst were filled into a lecture bottle at 0° C. Upon adding the carbonyl chlorofluoride an exothermic reaction occurred. The lecture bottle was closed and placed on a shaker for one hour at room temperature. The gases were removed and the product was analyzed by gas chromatography and purified by vacuum distillation. The conversion of the 1,3-oxide was 92.3 percent and the yield of 3-chloropropyl fluoroformate was 100%. The fluoroformate had the following properties: Colorless liquid, boiling point 45° C./13 mm. Hg; refr. index 1.4028 at 22° C.; density 1.241 at 24.5° C.

*Analysis.*—Calculated for $Cl(CH_2)_3OCOF$: C, 34.18; H, 4.30; F, 13.52; Cl, 25.23. Found: C, 34.08; H, 4.42; F, 13.81; Cl. 25.38.

EXAMPLE 3

The reaction between tetrahydrofuran and carbonyl chlorofluoride was carried out in the same manner as the reactions in the previous examples. More severe reaction conditions were required to reach a high conversion of the starting material. In accordance with the present invention, hydrogen chloride or a hydrogen chloride source was employed as a second catalyst to facilitate opening the larger hetero-ring. Whereas, hydrogen chloride gas may be used, a more satisfactory slow releasing source of in situ hydrogen chloride is preferred. The addition of an alcohol or preferably a glycol was used as the hydrogen chloride source in combination with excess carbonyl chlorofluoride. In addition to a second catalyst, higher temperatures in the range of 100° C. were required. The following table lists several reactions between tetrahydrofuran and carbonyl chlorofluoride.

TABLE II

| No. | Temp.° | Molar Ratio | | Catalyst (percent) | Conversion of THF (percent) | Yield (percent) $Cl(CH_2)_4OCF$ |
| --- | --- | --- | --- | --- | --- | --- |
| | | THF | COFCl | | | |
| 1 | 100 | 1.0 | 4.2 | $n(But)_3(4)$ | 3 | 80 |
| 2 | 100 | 1.0 | 1.46 | $N(But)_3(2)$, glycol (24). | 99 | 80 |

As indicated, there was obtained from the reactions 4-chloro-n-butyl fluoroformate with a boiling point of 62° C. at 11 mm. Hg; refractive index 1.4102 at 30° C.; density 1.207 at 26°C.

*Analysis.*—Calculated for $Cl(CH_2)_4OCOF$: C, 38.8; H, 5.18; F, 12.2; Cl, 22.9. Found: C, 38.85; H, 5.29; F, 11.7; Cl, 23.25. Infrared spectra confirmed the structure, as well as $F^{19}$ and proton resonance spectra.

EXAMPLE 4

The procedure of the previous examples was repeated using tetrahydropyran. A second hydrogen chloride source catalyst as well as higher temperatures were also required as in Example 3. A molar ratio of 1.0 to 1.2, tetrahydropyran to carbonyl chlorofluoride, was heated at 130° C. for 14 hours in the presence of 2% tri-n-butylamine and 4% ethylene glycol as catalysts. There was obtained a 43% conversion of tetrahydropyran and 55.4% yield of 5-chloro-n-pentyl fluoroformate. This was a colorless liquid with a boiling point of 38° C. at 2 mm. Hg; refractive index 1.4175 at 22° C. and density 1.142 at 24.5° C.

*Analysis.*—Calculated for $Cl(CH_2)_5OCOF$: C, 21.03; H, 5.98; Cl, 42.74; F, 11.27. Found: C, 21.49; H, 5.87; Cl, 42.90, and F, 11.53.

EXAMPLE 5

In the same manner as the foregoing examples, carbonyl chlorofluoride (0.31 mole) was added slowly at 0° C. to a mixture of propylene oxide(1,2) (0.3 mole) and tri-n-butylamine (0.2 ml.) in a lecture bottle. A rapid exothermic reaction occurred. The cylinder was closed and shaken for a short period. A conversion of 99.9 percent of the propylene oxide and 99.9 percent yield of the two possible chloropropyl fluoroformates was obtained. According to nuclear magnetic resonance spectra the product contained 75 percent 1-chloropropyl fluoroformate and 25 percent 2-chloropropyl fluoroformate. They exhibited very similar boiling points, 30° C. at 12.5 mm. Hg and could not be separated.

*Analysis.*—Calculated for $C_4H_6ClFO_2$: C, 34.18; H, 4.30; Cl, 25.23; F, 13.52. Found: C, 34.19; H, 4.02; Cl, 25.28; F, 12.9.

EXAMPLE 6

The procedure of the foregoing examples was repeated using 0.3 mole of butadiene monoxide and 0.46 mole of carbonyl chlorofluoride with 0.2 ml. of tri-n-butylamine as a catalyst. A rapid reaction began when the carbonyl chlorofluoride was added to the other reagents in a stainless steel lecture bottle cooled to 0° C. There was obtained after several hours reaction period in the sealed vessel a 100 percent conversion of the butadiene monoxide to 91.8 percent mixed fluoroformates and 8.2 percent carbonate. Proton and $F^{19}$ resonance established the following isomer distribution; 85 percent 1-chloromethyl propenyl-2 fluoroformate and 15 percent 2-chloro-n-butenyl-3 fluoroformate. The isomers could not be separated by normal techniques. They had a boiling point of 39° C. at 11 mm. Hg.

EXAMPLE 7

The procedure of the foregoing examples was repeated with butadiene dioxide (0.2 mole) and carbonyl chlorofluoride (0.22 mole) in the presence of tri-n-butylamine (0.2 ml.). A violent, exothermic reaction occurred when no solvent was used. The reaction was run therefore with benzene added to moderate the reaction. There was obtained a 100 percent conversion of butadiene dioxide and a 30 percent yield of three different dichloro-n-butylene bisfluoroformate isomers:

Percent
(A) $CH_2ClCH(OCOF)CH(OCOF)CH_2Cl$ ——— 35
(B) $CH_2(OCOF)CHClCH(OCOF)CH_2Cl$ ——— 26
(C) $CH_2(OCOF)CHClCHClCH_2(OCOF)$ ——— 39

The isomers has a boiling point range of 55° to 57° C. at 1 mm. Hg and could not be separated by the usual techniques.

*Analysis.*—Calculated for $C_6H_6Cl_2F_2O_4$: C, 28.71; H, 2.41; Cl, 28.25; F, 15.14. Found: C, 28.96; H, 2.67; Cl, 28.63; F, 14.9.

The new and novel process illustrated by the afore-described examples is equally applicable to the preparation of other chlorine substituted alkyl fluoroformates as stated herein supra. The compounds thereby produced find many uses as intermediates and can be easily converted to fluorochloroalkanes and substituted fluorochloroalkanes by decarboxylation.

Various changes and modifications may be made in the process described herein as will be apparent to those skilled in the chemical arts. It is accordingly intended that the present invention only be limited by the scope of the appended claims.

We claim:

1. A process for the preparation of chlorine-substituted alkyl fluoroformates comprising reacting under substantially anhydrous conditions a heterocyclic compound in which the hetero-atom is oxygen and the carbon chain of said heterocyclic compound contains from 2 to 5 carbon atoms inclusive with carbonyl chlorofluoride in the presence of a catalytic amount of a saturated tertiary amine.

2. The process of claim 1 in which said saturated tertiary amine is tri-n-butylamine.

3. A process for the preparation of chlorine-substituted alkyl fluoroformate comprising reacting under substantially anhydrous conditions a heterocyclic compound in which the hetero-atom is oxygen and the carbon chain of said heterocyclic compound contains 4 or 5 carbon atoms, with an excess of carbonyl chlorofluoride in the presence of catalytic amounts of a saturated tertiary amine and hydrogen chloride.

4. The process of claim 3 in which said saturated tertiary amine is tri-n-butylamine and in which said hydrogen chloride is prepared in situ from the reaction of an alkanol and said carbonyl chlorofluoride.

5. The process of claim 4 in which said alkanol is ethylene glycol.

References Cited

UNITED STATES PATENTS 2,518,058  8/1950  Peckukas ——————— 260—463
2,820,810  1/1958  Frevel et al. ——————— 260—463

CHARLES B. PARKER, *Primary Examiner.*

L. C. MARUZO, *Assistant Examiner.*

U.S. Cl. X.R.

260—653, 77.5